No. 697,779. Patented Apr. 15, 1902.
N. BARNEY.
ASH CART.
(Application filed July 10, 1901. Renewed Mar. 12, 1902.)

(No Model.)

Witnesses
Ralph Jonas
Henry Best

Nathan Barney Inventor
By his Attorney C. N. Edwards

THE NORRIS PETERS CO., PHOTO-LITHO., WASHINGTON, D. C.

UNITED STATES PATENT OFFICE.

NATHAN BARNEY, OF NEW YORK, N. Y.

ASH-CART.

SPECIFICATION forming part of Letters Patent No. 697,779, dated April 15, 1902.

Application filed July 10, 1901. Renewed March 12, 1902. Serial No. 97,803. (No model.)

*To all whom it may concern:*

Be it known that I, NATHAN BARNEY, a citizen of the United States, residing at New York city, in the county of Kings and State of New York, have invented certain new and useful Improvements in Ash-Carts, of which the following is a full, clear, and exact specification.

This invention relates to ash-carts; and its object is to construct an ash-cart which will prevent the ashes from being scattered by the wind while being handled in loading and unloading the cart.

A further object is to provide means for converting carts of ordinary manufacture into carts embodying my invention.

The invention also comprehends further features of advantage, which will be referred to hereinafter and will be described more in detail with reference to the accompanying drawings, in which—

Figure 1:
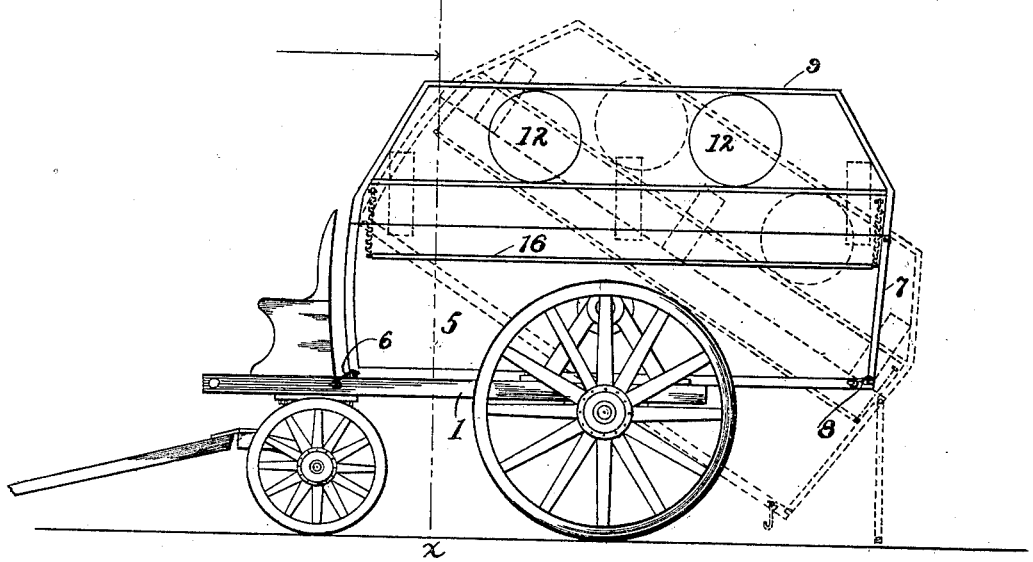
Figure 2:
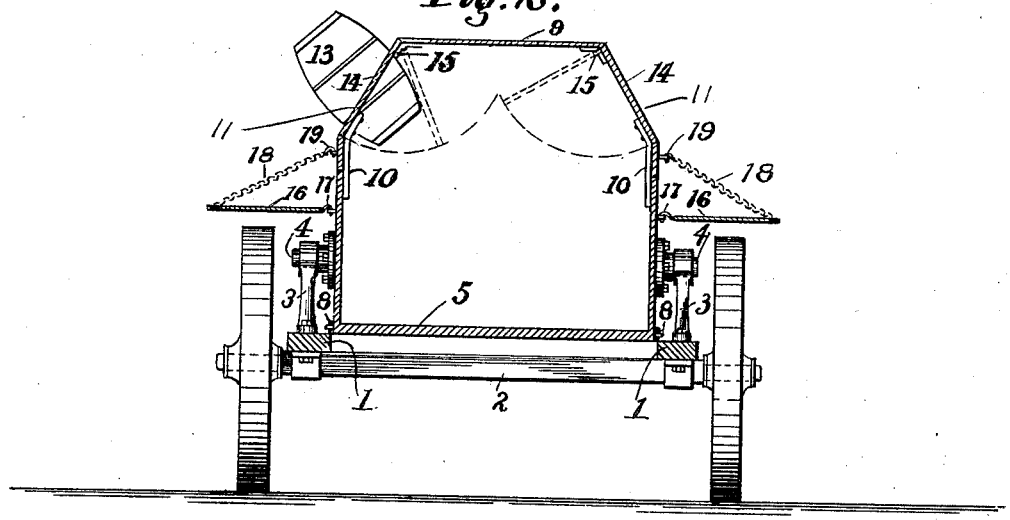

Figure 1 is a side view of a cart embodying my invention, showing in dotted lines the position of the body when the cart is dumped; and Fig. 2 is a front sectional view taken on the line $x\ x$ in Fig. 1.

Referring more particularly to the drawings, 1 represents the frame of the wagon mounted upon the axle 2. Upon the frame are carried the standards 3 3, in which are pivoted the hub-pivots 4 4, which are attached to the respective sides of the body 5. The hook 6 is adapted to hold the body in position to retain the load, and a pivoted tail-board 7 is adapted to be hooked in closed position by a hook 8. A cover 9, corresponding in contour with the shape of the body 5, is adapted to rest upon the top of the body and by means of suitable cleats or braces 10 10 10 is held in position upon said body. At the same time the entire cover may be lifted off from the body. The cover is also preferably provided with the inclined sides 11 11. In the sides of the cover are formed one or more openings 12 12, these openings being preferably rounded in order to conveniently receive the end of the barrel or can 13. Covers 14 14 are adapted to close the openings 12 12 and are preferably attached to the cover 9 by means of spring-hinges 15 15, which tend to hold the covers in closed position. At the sides of the body 5 are provided the foot-boards 16 16, these boards being preferably removably attached. A convenient arrangement is that shown in the drawings, wherein the boards are hooked to the sides of the body by hooks 17, and the outer ends of the boards are suspended by chains 18, attached to the body 5 by hooks 19.

In the operation of the cart the cover is placed in position resting upon the top of the body 5 and held in place by the cleats 10 10. The spring-hinges 15 15 hold the covers 14 closed. The operators first lift the barrels up onto the foot-board 16, and then the operator standing upon the foot-board 16 will place the barrel or can against the cover 14. The weight of the can forces the door open and the contents of the can are emptied into the body 5. As the can is withdrawn the spring-hinges 15 close the covers, and thus prevent the ashes from being scattered by the wind or otherwise.

In order to use the cart for other purposes, it is only necessary to unhook the foot-boards 16 and chains 18 from the cart and then lift the cover 9 off of the body.

It will be understood, of course, that the construction above shown may be varied in numerous respects without departing from the invention, and I therefore desire it to be understood that I do not herein limit myself to the precise construction shown.

Having thus described my invention, I declare that what I claim as new, and desire to secure by Letters Patent, is—

1. In a cart, the combination with the body portion, of a cover adapted to loosely rest thereon and having cleats adapted to normally maintain said cover in place, said cover having inclined sides, one or more openings in said inclined sides of said cover, a plurality of covers for said openings, and springs adapted to normally hold said last-named covers closed, substantially as described.

2. In a cart, the combination with the body portion thereof of a detachable cover resting upon said body portion and having one or more openings therein, normally closed covers for said openings, and a detachable foot-board carried by said body portion below said openings, substantially as described.

3. In a cart, the combination of the body portion pivoted upon the frame of the cart, a cover for said body portion, a tail-board at the rear of said body portion, one or more openings in said cover, spring-pressed covers for said openings, and a detachable foot-board carried by said body portion below said openings, substantially as described.

In testimony whereof I affix my signature in presence of two witnesses.

NATHAN BARNEY.

Witnesses:
C. V. EDWARDS,
RALPH JONAS.